US011474375B1

(12) United States Patent
Dahnoun

(10) Patent No.: US 11,474,375 B1
(45) Date of Patent: Oct. 18, 2022

(54) TEMPLE MOUNTED EYEGLASS FRAMES AND METHODS OF MAKING AND USING THE SAME

(71) Applicant: Abid Al Hamid Mustafa Dahnoun, Cary, NC (US)

(72) Inventor: Abid Al Hamid Mustafa Dahnoun, Cary, NC (US)

( * ) Notice: Subject to any disclaimer, the term of this patent is extended or adjusted under 35 U.S.C. 154(b) by 0 days.

(21) Appl. No.: 17/717,316

(22) Filed: Apr. 11, 2022

(51) Int. Cl.
*G02C 5/14* (2006.01)
*G02C 5/12* (2006.01)

(52) U.S. Cl.
CPC ............. *G02C 5/143* (2013.01); *G02C 5/126* (2013.01); *G02C 5/146* (2013.01)

(58) Field of Classification Search
CPC ......... G02C 5/143; G02C 5/126; G02C 5/146
USPC .................................................. 351/41, 158
See application file for complete search history.

(56) References Cited

U.S. PATENT DOCUMENTS

| 3,666,355 | A | * | 5/1972 | Griffith | G02C 5/20 351/111 |
| 4,670,915 | A | * | 6/1987 | Evans | A61F 9/025 2/443 |
| 5,737,055 | A | * | 4/1998 | Dittmeier | G02C 5/126 351/138 |
| 7,607,775 | B2 | * | 10/2009 | Hermanson | G02C 11/04 362/208 |
| 10,962,800 | B1 | * | 3/2021 | Mikich | G02C 5/143 |

\* cited by examiner

*Primary Examiner* — Tuyen Tra
(74) *Attorney, Agent, or Firm* — Ashley D. Johnson; Dogwood Patent and Trademark Law

(57) ABSTRACT

The invention is directed to eyeglass frames that are mounted and maintained on a user's temple area, providing added comfort and stability. The frames include a pair of rims for enclosing a pair of lenses. The rims are connected to each other via a bridge that can also include a nosepiece for resting the frames on the bridge of the user's nose. The rims further connect to a pair of arms that extend on either side of the user's head with temple pads comfortably retaining the frames on the user. In some embodiments, the frames can further include earpieces that extend behind the user's ears. Advantageously, the disclosed frames can securely and comfortably be worn by the user.

18 Claims, 14 Drawing Sheets

TEMPLE MOUNTED EYEGLASS FRAMES AND METHODS OF MAKING AND USING THE SAME

TECHNICAL FIELD

The presently disclosed subject matter is generally directed to eyeglass frames that mount on a user's temple region, with or without an earpiece. The presently disclosed subject matter further includes methods of making and using the disclosed frames.

BACKGROUND

As early as the 13th century, people have worn eyeglasses to correct problems associated with poor vision. Over time, significant improvements to the design of eyeglasses have been made. However, current eyeglass frames suffer from many drawbacks related to the general design, shape, feel, and/or sensation of the glasses. Many of the drawbacks originate from the sensation of pressure behind the ears when the glasses are worn. Users also complain about the discomfort associated with the nose pads used with eyeglass frames, which often leave pressure indentations in the skin. In addition, frames often slide down the user's nose due to perspiration, improper fit, or frame material. Further, movement of the glasses while walking, running, and the like is also a major disadvantage of current frame designs. It would therefore be beneficial to provide an improved eyeglass frame that overcomes the shortcomings of the prior art, offering improved comfort and stability.

SUMMARY

In some embodiments, the presently disclosed subject matter is directed to a pair of eyeglass frames. Specifically, the frames comprise first and second rims configured to retain a lens, wherein each rim comprises an inner cavity, an outer edge and an opposed inner edge, and a front surface and an opposed rear surface. The frames further include a bridge connecting the inner edges of the first and second rims. The frames also include a nosepiece. The frames comprise a first arm defined by a first end attached to the outer edge of the first rim and a second end comprising a temple pad. The frames include a second arm comprising a first end attached to the outer edge of the second rim and a second end comprising a temple pad. The temple pads are each defined by a first surface and an opposed second surface.

In some embodiments, the frames further comprise a pair of lenses, one positioned in each rim inner cavity.

In some embodiments, the nosepiece comprises an inverted U-shaped member positioned on a lower edge of the bridge.

In some embodiments, the nosepiece comprises a pair of attachments, each attachment comprising a first end connected to a rear surface of the bridge, and a second end comprising padding.

In some embodiments, the frames include a first extension positioned between the first end of the first arm and the outer edge of the first rim, and a second extension positioned between the first end of the second arm and the outer edge of the second rim.

In some embodiments, each extension comprises a hinge.

In some embodiments, each arm comprises a first segment positioned adjacent to the first or second rim, the first segment configured in a first shape and a second segment positioned adjacent to the first segment, wherein the second segment has a shape that differs from the shape of the first segment.

In some embodiments, the second segment has a tapered shape.

In some embodiments, the temple pads have a circular cross-sectional shape.

In some embodiments, each temple pad first surface, second surface, or both are convex.

In some embodiments, each temple pad first surface, second surface, or both are concave.

In some embodiments, the frames further include a first earpiece attached to the second end of the first arm, and a second earpiece attached to the second end of the second arm.

In some embodiments, the first and second earpieces comprise a circular shape.

In some embodiments, the presently disclosed subject matter is directed to an eyeglass frame kit. The kit comprises one or pairs of rims, each pair of rims defined by first and second rims configured to retain a lens, wherein each rim comprises an inner cavity, an outer edge and an opposed inner edge, and a front surface and an opposed rear surface. The kit includes one or more bridges connecting the inner edges of a pair of first and second rims. The kit further comprises one or more nosepieces. The kit includes one or more pairs of arms, each pair of arms defined by a first arm comprising a first end attached to the outer edge of a first rim and a second end comprising a temple pad, and a second arm comprising a first end attached to the outer edge of a second rim and a second end comprising a temple pad. Each temple pad is defined by a first surface and an opposed second surface.

In some embodiments, the kit further includes one or more pairs of earpieces, each pair of earpieces defined by a first earpiece attached to the second end of a first arm, and a second earpiece attached to the second end of a second arm.

In some embodiments, the presently disclosed subject matter is directed to a method of retaining a pair of eyeglass frames on a wearer. Specifically, the method comprises positioning a pair of eyeglass frames on the wearer, wherein the eyeglass frames defined by first and second rims configured to retain a lens. Each rim comprises an inner cavity, an outer edge and an opposed inner edge, and a front surface and an opposed rear surface. The frames include a bridge connecting the inner edges of the first and second rims. The frames further include a nosepiece. The frames comprise a first arm defined by a first end attached to the outer edge of the first rim and a second end comprising a temple pad. The frames comprise a second arm defined by a first end attached to the outer edge of the second rim and a second end comprising a temple pad. The frames comprise optional earpieces defined by a first earpiece attached to the second end of the first arm, and a second earpiece attached to the second end of the second arm. Each temple pad is defined by a first surface and an opposed second surface. The method comprises positioning the bridge on a top surface of the wearer's nose. The method also include positioning the first surface of each temple pad adjacent to a temple region of the wearer, wherein the eyeglass frames are retained on the wearer.

In some embodiments, the method further includes positioning the first earpiece around a first ear of the wearer and positioning the second earpiece around a second ear of the wearer.

In some embodiments, the first and second arms taper from the first end to the second end.

DETAILED DESCRIPTION

Figure 1A:
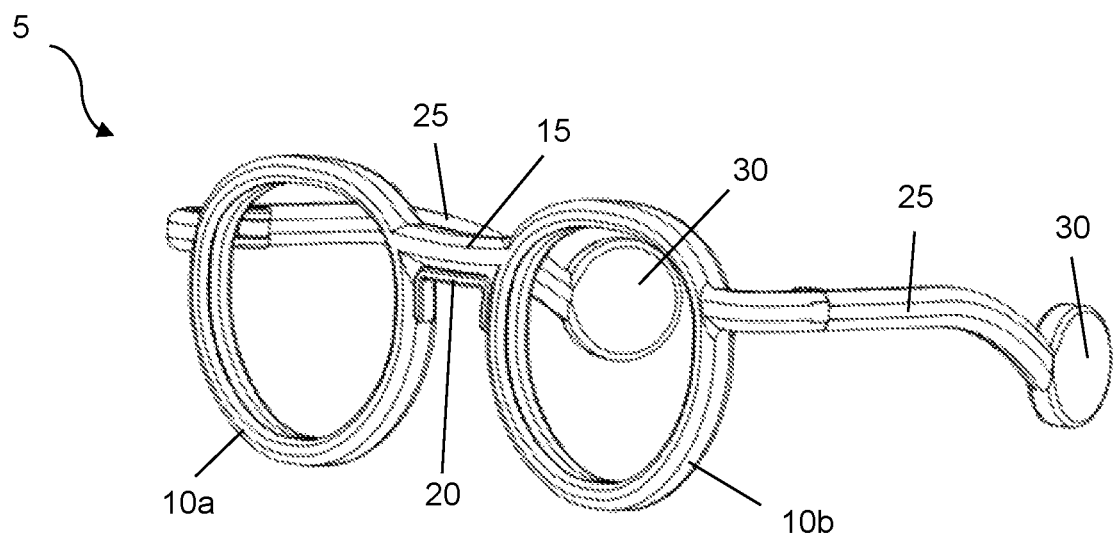
FIG. 1a is a perspective view of a pair of eyeglass frames in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1B:
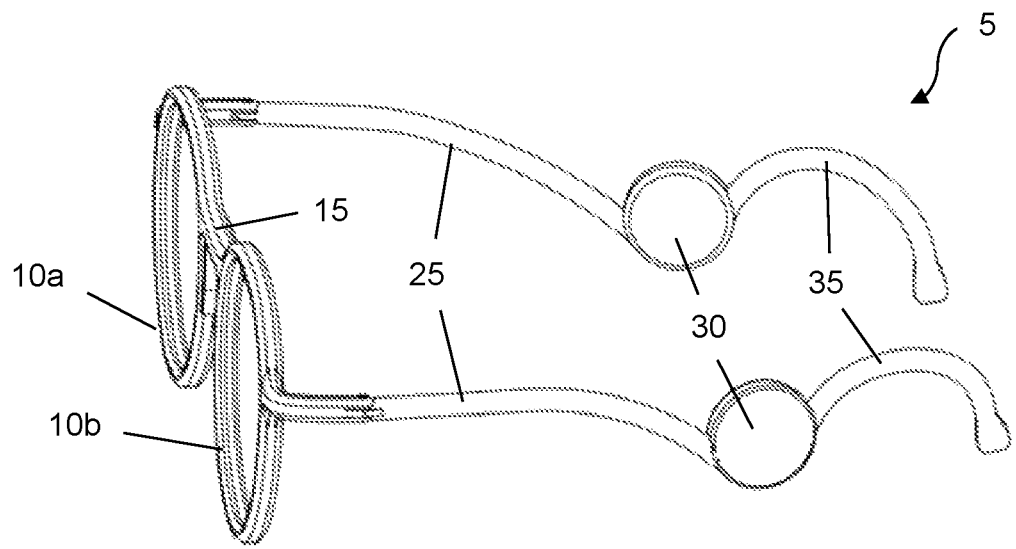
FIG. 1b is a side perspective view of a pair of eyeglass frames in accordance with some embodiments of the presently disclosed subject matter.

The presently disclosed subject matter is directed to eyeglass frames that are mounted and maintained on a user's temple area, providing added comfort and stability. The term "eyeglass frames" or "frames" broadly includes the entire eyeglasses (with or without lenses) and can include prescription eyeglasses for use in correcting vision, sunglasses, protective eyeglasses, reading glasses, and the like. FIG. 1a illustrates one embodiment of frames 5 comprising a pair of rims 10a, 10b for enclosing a pair of lenses. The rims are connected to each other via bridge 15, which can also include nosepiece 20 for resting the frames on the bridge of the user's nose. The rims further connect to a pair of arms 25 that extend on either side of the user's head with temple pad 30 comfortably retaining the frames on the user. In some embodiments, the frames can further include earpiece 35 that extends behind the user's ear, as illustrated in FIG. 1b. Advantageously, the disclosed frames can securely and comfortably be worn by the user.

Figure 2A:
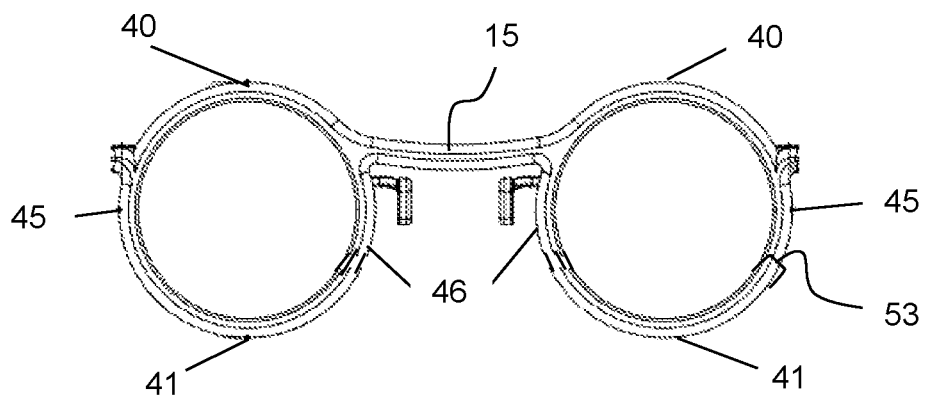
FIG. 2a is a front plan view of a pair of eyeglass rims in accordance with some embodiments of the presently disclosed subject matter.
Figure 2B:
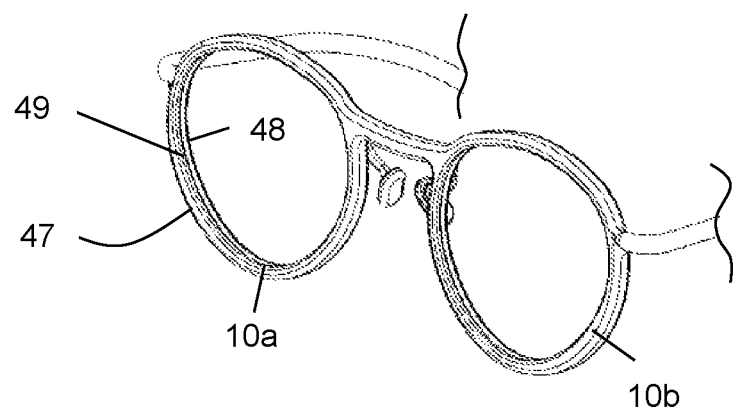
FIG. 2b is a side perspective view of a pair of eyeglass rims in accordance with some embodiments of the presently disclosed subject matter.

As set forth above, frames 5 include a pair of rims configured as first and second rims 10a and 10b, respectively. The rims are configured to enclose a pair of lenses, such as prescription lenses, non-prescription lenses, darkened (e.g., sunglasses) lenses, and/or lenses with any of various additional features, such as shatter-proof lenses, glare-resistant lenses, transitional lenses, polarized lenses, and the like. As shown in FIGS. 2a and 2b, rims 10a and 10b each include top edge 40 and opposed bottom edge 41, as well as outer edge 45 and opposed inner edge 46. The rims also include front surface 47 and opposed rear surface 48. In some embodiments, the rims include central groove 49 positioned between the front and rear surfaces configured to retain a lens using adhesive, screws, or any other conventional mechanism.

The rims can have any desired shape, such as the rounded embodiment illustrated in FIG. 2a. However, the frame shape is not limited, and the rims can be configured in any desired shape, including (but not limited to) circular, oval, square rectangular, heart-shaped, triangular, pentagonal, hexagonal, octagonal, and so forth.

Figure 2C:
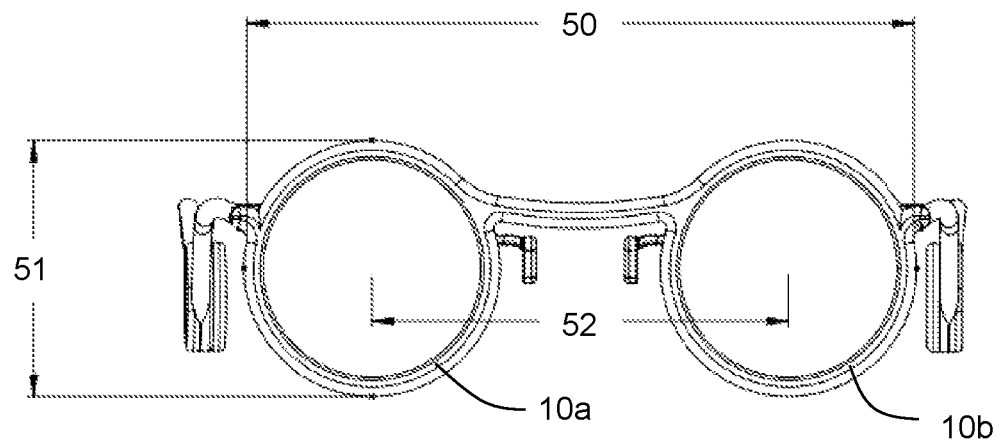
FIG. 2c is a front plan view of a pair of eyeglass rims in accordance with some embodiments of the presently disclosed subject matter.

In some embodiments, the rims can include length 50 of about 4-8 inches (e.g., at least/no more than about 4, 4.25, 4.5, 4.75, 5, 525, 5.5, 5.75, 6, 6.25, 6.5, 6.75, 7, 7.25, 7.5, 7.75, or 8 inches). The term "length" refers to the longest horizontal distance from opposed outer edges 45, as shown in FIG. 2c. The rims also include width 51 of about 1-3 inches (e.g., at least/no more than about 1, 1.25, 1.5, 1.75, 2, 2.25, 2.5, 2.75, or 3 inches). The term "width" refers to the longest vertical distance from the top edge to the bottom edge of rims 10. The rims can further comprise spacing 52 of about 2-5 inches (e.g., at least/no more than about 2, 2.25, 2.5, 2.75, 3, 3.25, 3.5, 3.75, 4, 4.25, 4.5, 4.75, or 5 inches). The term "spacing" refers to the distance between the midline of each lens. Continuing, the rims can have thickness 53 of about 0.1-1 inches (e.g., at least/no more than about 0.1, 0.2, 0.3, 0.4, 0.5, 0.6, 0.7, 0.8, 0.9, or 1 inch). It should be appreciated that the length, width, thickness, and spacing of the rims are not limited and can be configured outside the ranges given above.

Figure 3:
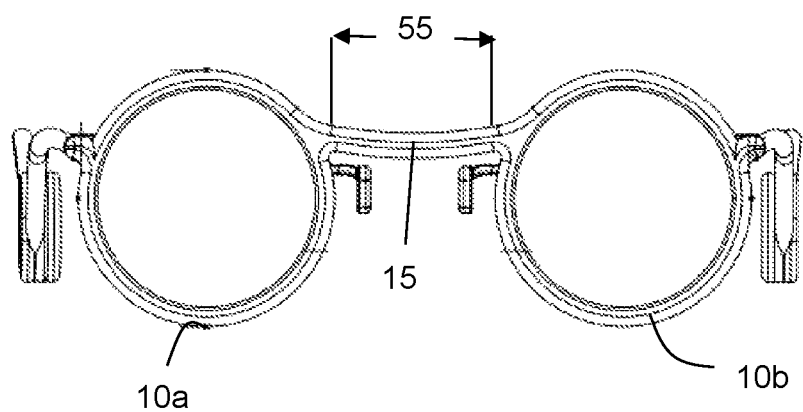
FIG. 3 is a front plan view of a pair of eyeglass rims illustrating a bridge in accordance with some embodiments of the presently disclosed subject matter.

Bridge 15 connects the rims 10a and 10b together along inner edges 46, as shown in FIG. 3. The bridge can have length 55 of about 0.5-3 inches (e.g., at least/no more than about 0.5, 0.75, 1, 1.25, 1.5, 1.75, 2, 2.25, 2.5, 2.75, or 3 inches). The bridge can attach to rims 10 using any suitable mechanism, such as the use of adhesive, magnets, mechanical elements (screws, bolts and the like), or combinations thereof. In other embodiments, the rims and bridge are formed as a single unit through thermoforming or other known methods. It should be appreciated that the bridge can be adapted to the shape of the nose of the wearer to provide a comfortable fit.

Figure 4A:
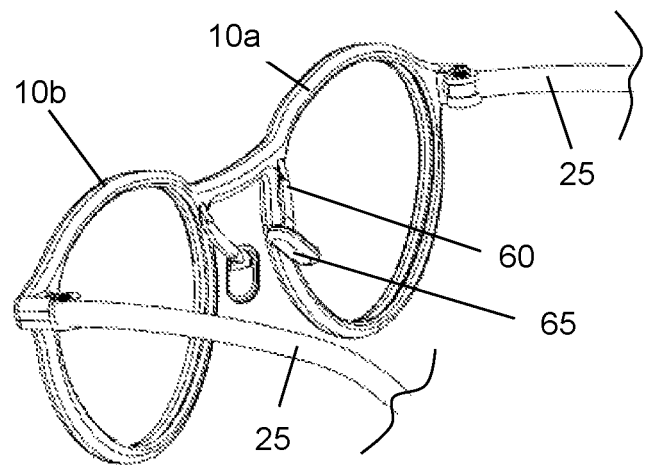
FIG. 4a is a perspective view of a pair of eyeglass rims depicting a pair of nosepieces in accordance with some embodiments of the presently disclosed subject matter.
Figure 4B:
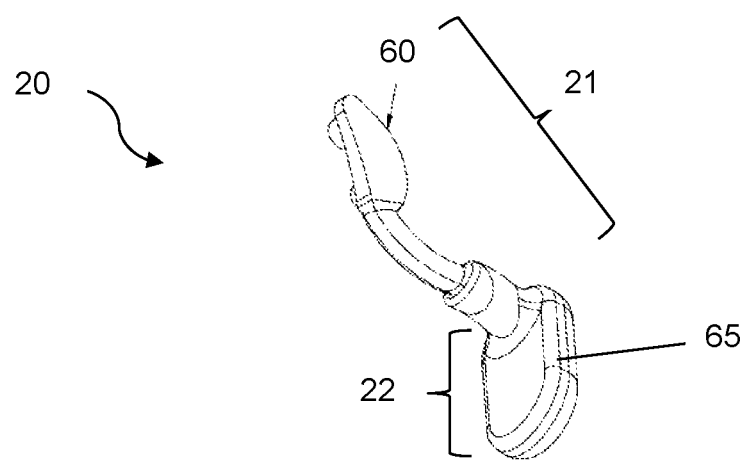
FIG. 4b is a perspective view of a nosepiece attachment and padding in accordance with some embodiments of the presently disclosed subject matter.

Nosepiece 20 attaches along the inner edge of rims 10, below the bridge. In some embodiments, the nosepiece is configured as a pair of individual nosepieces, each including attachment 60 and padding 65, as shown in FIGS. 4a and 4b. In some embodiments, the nose pieces attach to rim rear surface 48 (e.g., the side closest to the user's face when in use). However, the frames are not limited, and the nosepieces can be attached on any surface of frames 5. The attachment can be connected to the rims and/or bridge using any suitable mechanism, such as adhesive, welding, magnets, clips, snap-fit closure, pressure-fit closure, fasteners, and the like.

Attachment 60 can have length 21 of about 0.1-1 inches (e.g., at least/no more than about 0.1, 0.2, 0.3, 0.4, 0.5, 0.6, 0.7, 0.8, 0.9, or 1 inch). In some embodiments, the attachment can have a slightly curved orientation as shown in FIG. 4a. However, the attachment is not limited and can be linear or curved as desired by the user. Similarly, the padding can have length 22 of about 0.1-0.5 inches (e.g., at least/no more than about 0.1, 0.2, 0.3, 0.4, 0.5 inches).

Figure 5A:
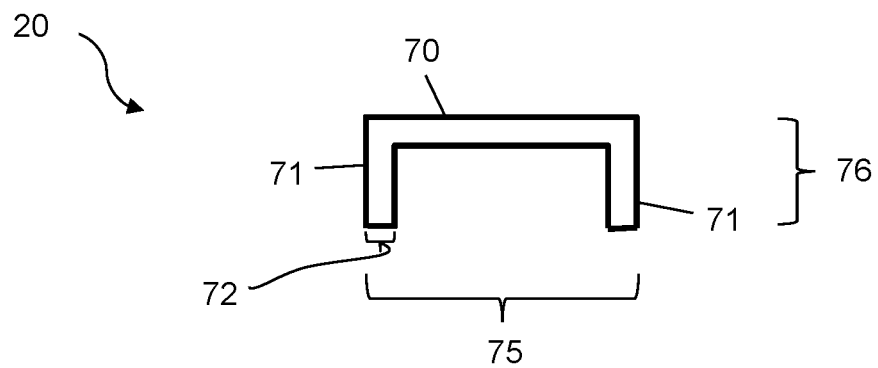
FIG. 5a is a front plan view of a one piece nosepiece in accordance with some embodiments of the presently disclosed subject matter.
Figure 5B:
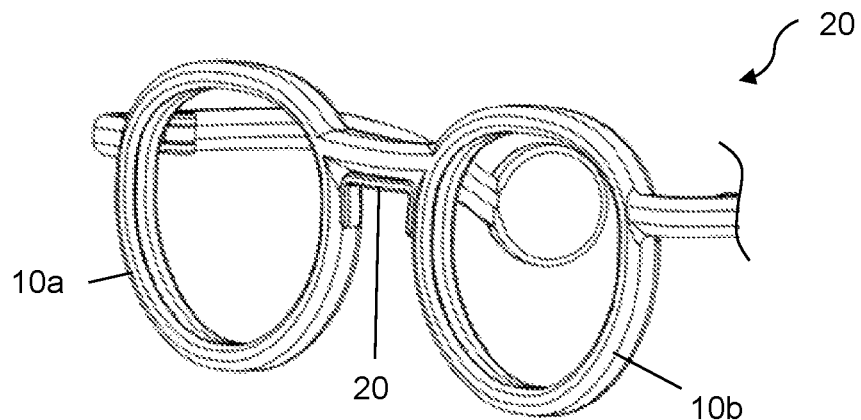
FIG. 5b is a perspective view of a pair of eyeglass frames comprising the nosepiece of FIG. 5a in accordance with some embodiments of the presently disclosed subject matter.
Figure 5C:
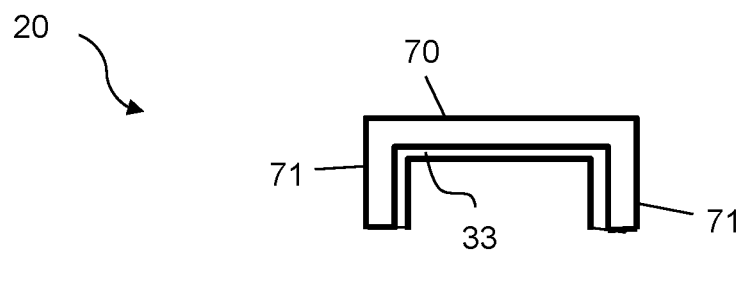
FIG. 5c is a front plan view of a nosepiece comprising an inner lining in accordance with some embodiments of the presently disclosed subject matter.

In other embodiments, nosepiece 20 can be configured as a single piece in an inverted U-shape positioned under the bridge, as shown in FIGS. 5a-5c. In these embodiments, the nosepiece includes main body 70 that attaches to a lower side of the bridge and a pair of legs 71 that provide stabilization. The nosepiece can be configured from comfortable material, such as (but not limited to), foam, padding, fabric, cloth, rubber, and the like. In other embodiments, the nosepiece can include inner lining 33 to provide an additional level of comfort. However, it should be appreciated that the nosepiece can be made from any material (e.g., wood, metal, plastic). The main body and legs are connected to the frames using any suitable mechanism, such as (but not limited to) the use of adhesive, welding, magnets, clips, fasteners, screws, and the like. Nosepiece 20 is therefore coupled with the bridge to rest on the nose of the wearer, ensuring that the frames are comfortable against the skin and to help secure the frames in place on the face.

Main body 70 and legs 71 can have lengths 75, 76, respectively, of about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches). The main body and legs can further have thickness 72 of about 0.01-0.5 inches. However, it should be appreciated that the dimensions of the nosepiece is not limited.

Figure 6A:
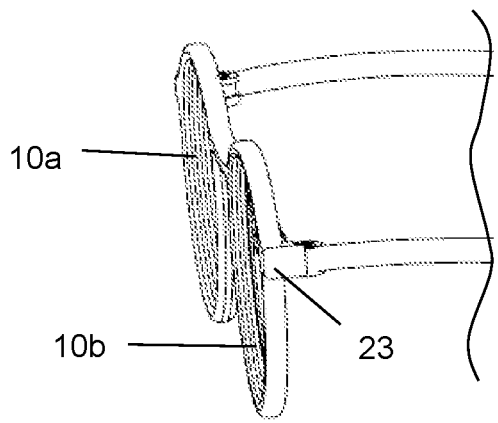
FIG. 6a is a side perspective view of a pair of frames including an extension in accordance with some embodiments of the presently disclosed subject matter.
Figure 6B:
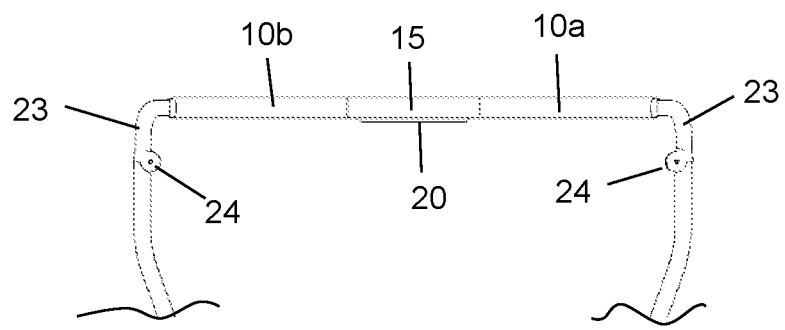
FIG. 6b is a fragmentary top plan view of a pair of frames comprising an extension and hinge in accordance with some embodiments of the presently disclosed subject matter.

In some embodiments, the lateral side of each rim 10a, 10b is connected to extension 23 provided on the lateral sides of each arm 25, as shown in FIGS. 6a and 6b. The extension can include hinge 24 to allow the associated arm to pivot. However, it should be appreciated that the disclosed frames can be configured without an extension and/or hinge in some embodiments.

Figure 7A:
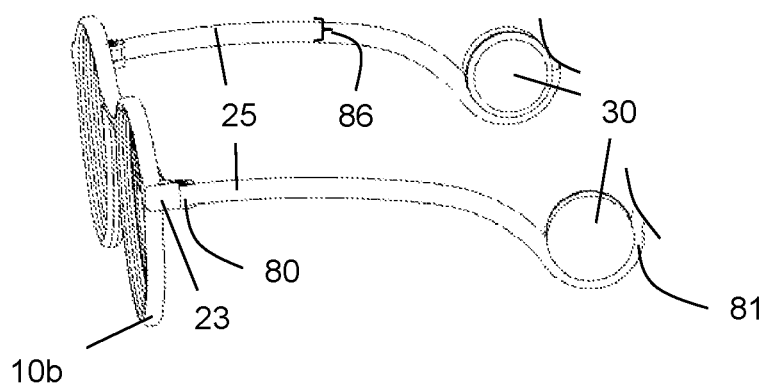
FIG. 7a is a side perspective view of a pair of frames in accordance with some embodiments of the presently disclosed subject matter.
Figure 7B:
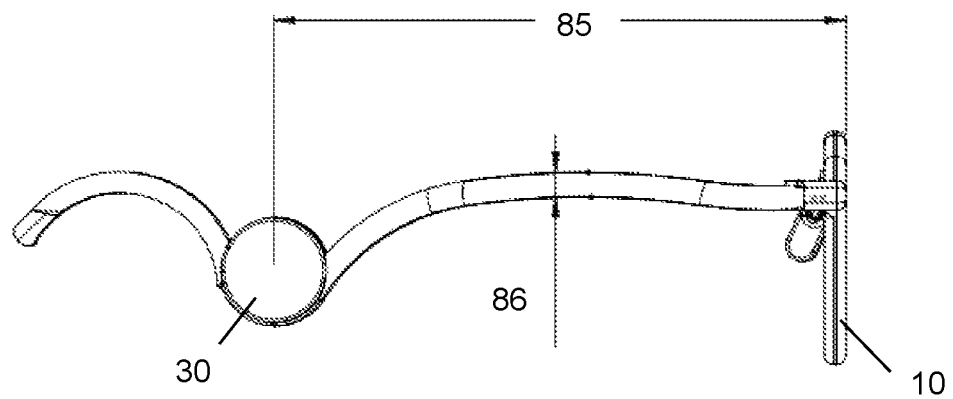
FIG. 7b is a side plan view of a pair of a eyeglass frames in accordance with some embodiments of the presently disclosed subject matter.

The disclosed frames further include an elongated pair of arms 25, each attached to outer edge 45 of a rim, as shown in FIGS. 7a and 7b. Each arm includes first end 80, connected to rim 10 or extension 23 and second end 81 comprising temple pad 30. Length 85 of each arm can be about 3-8 inches (e.g., at least/no more than about 3, 3.5, 4, 4.5, 5, 5.5, 6, 6.5, 7, 7.5, or 8 inches). Each arm can further include any desired thickness 86, such as about 0.1-2 inches (e.g., at least/no more than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches).

Figure 7C:
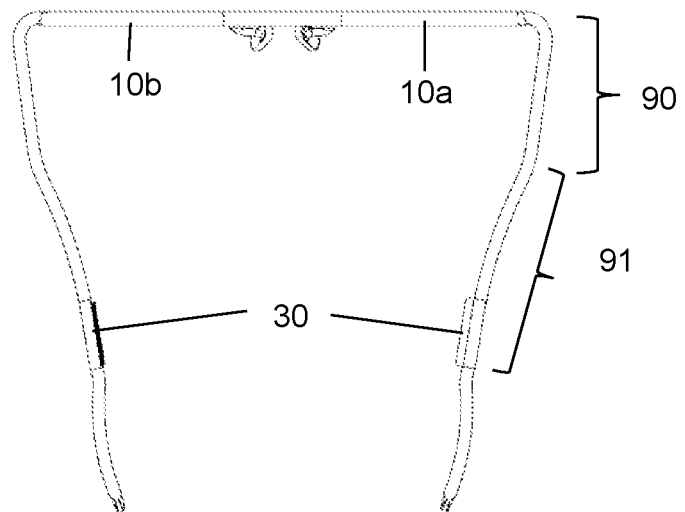
FIGS. 7c and 7d are top plan views of eyeglass frames comprising two frame configurations in accordance with some embodiments of the presently disclosed subject matter.
Figure 7D:
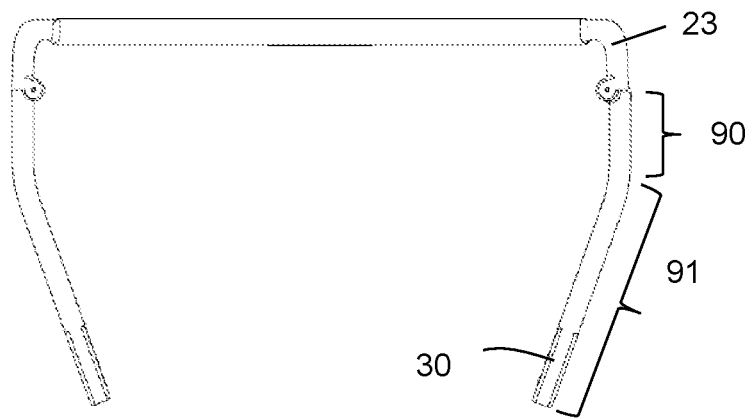

In some embodiments, each arm 25 can include first segment 90 and second segment 91 comprising the temple pad. The first segment can taper from rims 10 towards the second segment, as shown in FIG. 7c. In other embodiments, the first segment can be about linear, as shown in the embodiment of FIG. 7d. Second segment 91 can taper inward, towards the wearer's head when in use to help retain the frames on the wearer. The arms can therefore include any shape, such as linear, angled, tapered, curved, and the like.

Figure 8A:
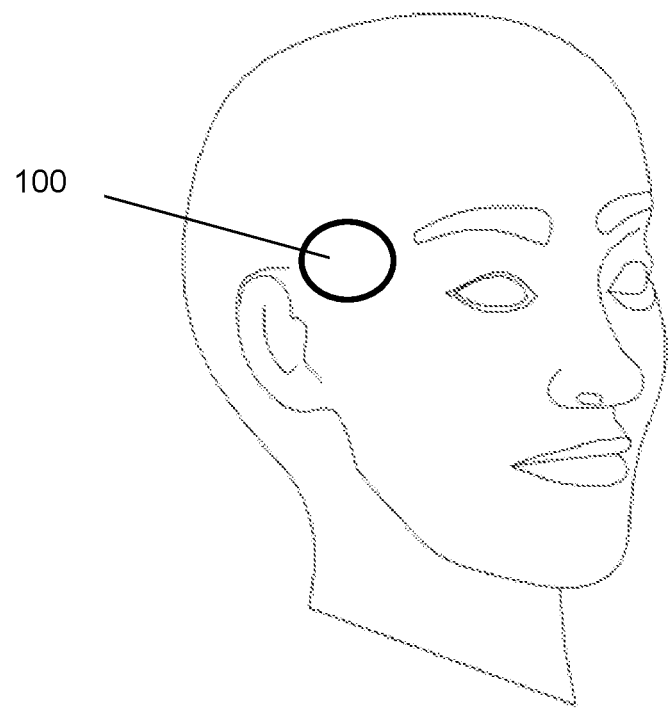
FIG. 8a is a perspective view of a wearer's face, illustrating the temple region in accordance with some embodiments of the presently disclosed subject matter.
Figure 8B:
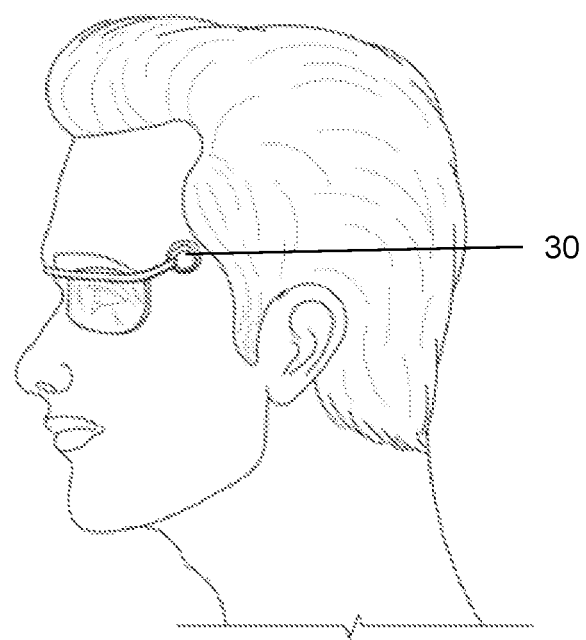
FIG. 8b is a side plan view of frames positioned on a wearer in accordance with some embodiments of the presently disclosed subject matter.

Temple pad 30 is positioned on second end 81 of each arm to provide added comfort to the user and to securely retain the frames on the user's face. Specifically, the temple pad is configured to rest on the user's bony temple region 100, as shown in FIGS. 8a and 8b. Each temple pad is formed from a resilient material, such as (but not limited to) rubber, cotton, cloth, plastic, and the like to provide comfort to the user's temple region. The curved temple pad can include an optional lining (positioned adjacent to the user's skin) to allow for proper fit.

Figure 9A:
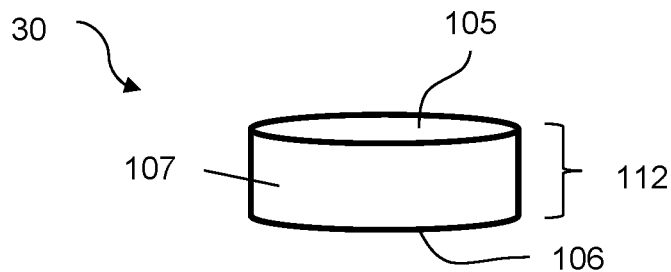
FIG. 9a is a perspective view of a temple pad in accordance with some embodiments of the presently disclosed subject matter.
Figure 9B:
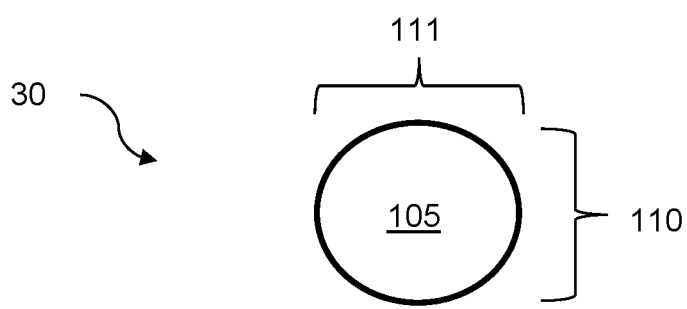
FIG. 9b is a top plan view of the temple pad of FIG. 9a in accordance with some embodiments of the presently disclosed subject matter.

One embodiment of temple pad 30 is illustrated in FIGS. 9a and 9b. As shown, the temple pad includes first surface 105 (which is in direct contact with the user's skin when the frames are in use), opposed second surface 106, and body 107 therebetween. Each temple pad can have length 110 and/or width 111 of about 0.5-2 inches (e.g., at least/no more than about 0.5, 0.6, 0.7, 0.8, 0.9, 1, 1.1, 1.2, 1.3, 1.4, 1.5, 1.6, 1.7, 1.8, 1.9, or 2 inches). Each temple pad can further include thickness 112 of about 0.1-1 inches (e.g., at least/no more than about 0.12, 0.2, 0.3, 0.4, 0.5, 0.6, 0.7, 0.8, 0.9, or 1 inch).

Figure 9C:
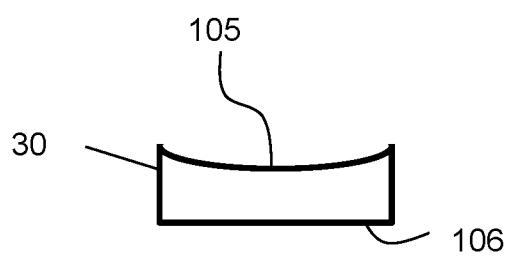
FIGS. 9c-9e are side plan views of temple pads in accordance with some embodiments of the presently disclosed subject matter.
Figure 9D:
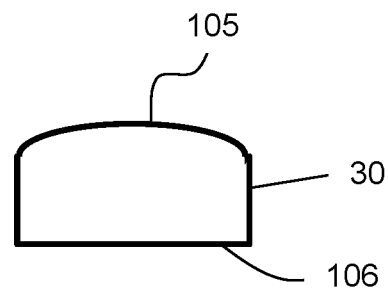
Figure 9E:
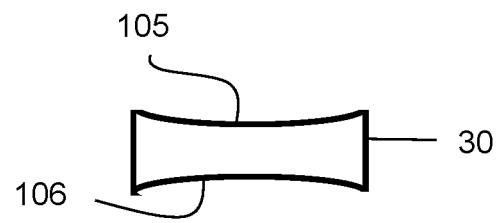

In some embodiments, at least one of first or second surfaces 105, 106 of each temple pad can be curved, as shown in FIGS. 9c and 9d. For example, the temple pads can include a concave or convex surface. The term "concave" refers to an inwardly extending or recessed region that can be curved and/or straight (U-shaped). The term "convex" refers to an outward protrusion and can be curved and/or straight. In some embodiments, only one of the first and second surfaces of the temple pad are curved. However, the presently disclosed subject matter also includes embodiments wherein both of the first or second surfaces is curved, as illustrated in FIG. 9e.

Temple pad 30 can have any desired cross-sectional shape. Thus, each temple pad can have a circular, oval, square, rectangular, triangular, pentagonal, hexagonal, octagonal, etc. shape.

Figure 10:
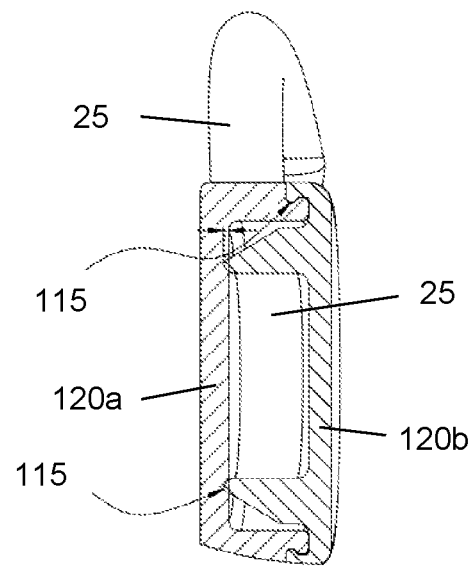
FIG. 10 is a front plan view of a temple pad attaching to a frame arm in accordance with some embodiments of the presently disclosed subject matter.

The temple pads are retained on second end 81 of each arm using any suitable mechanism, such as clips, magnets, screws, adhesive, welding, fasteners, snaps, and the like. For example, FIG. 10 illustrates one embodiment of temple pad 30 comprising two cooperating sections 120a, 120b that snap together at interfaces 115. In this way the temple pads can fit around arms 25. However, this is one example of a mechanism by which a temple pad can be connected to an arm, and any mechanism can be used.

Figure 11:
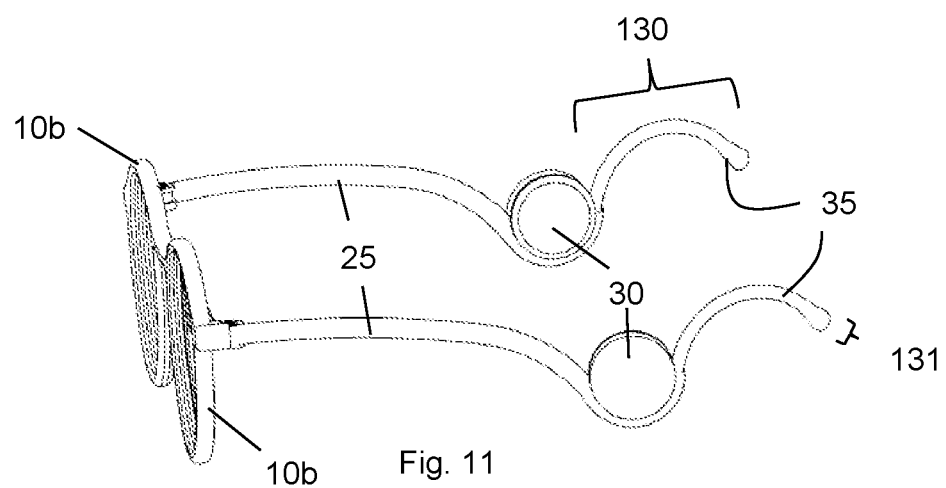
FIG. 11 is a side perspective view of frames comprising earpieces in accordance with some embodiments of the presently disclosed subject matter.

Optionally, frames 5 can include earpieces 35 attached to the second end of arms 25, as depicted in FIG. 11. The earpieces are sized and shaped to fit at least partially around the ears to further stabilize the frames and ensure that they are properly positioned on the wearer's face. For example, the earpieces can each have a curved shape to comfortably fit around a wearer's ear. Each earpiece can have length 130 of about 0.5-2 inches (e.g., at least/no more than about 0.5, 0.6, 0.7, 0.8, 0.9, 1, 1.1, 1.2, 1.3, 1.4, 1.5, 1.6, 1.7, 1.8, 1.9, or 2 inches). The earpiece can further include thickness 131 of about 0.1-1 inch (e.g., at least/no more than about 0.1, 0.2, 0.3, 0.4, 0.5, 0.6, 0.7, 0.8, 0.9, or 1 inch). However, it should be appreciated that the dimensions of earpieces 35 are not limited to the ranges given above.

Figure 12:
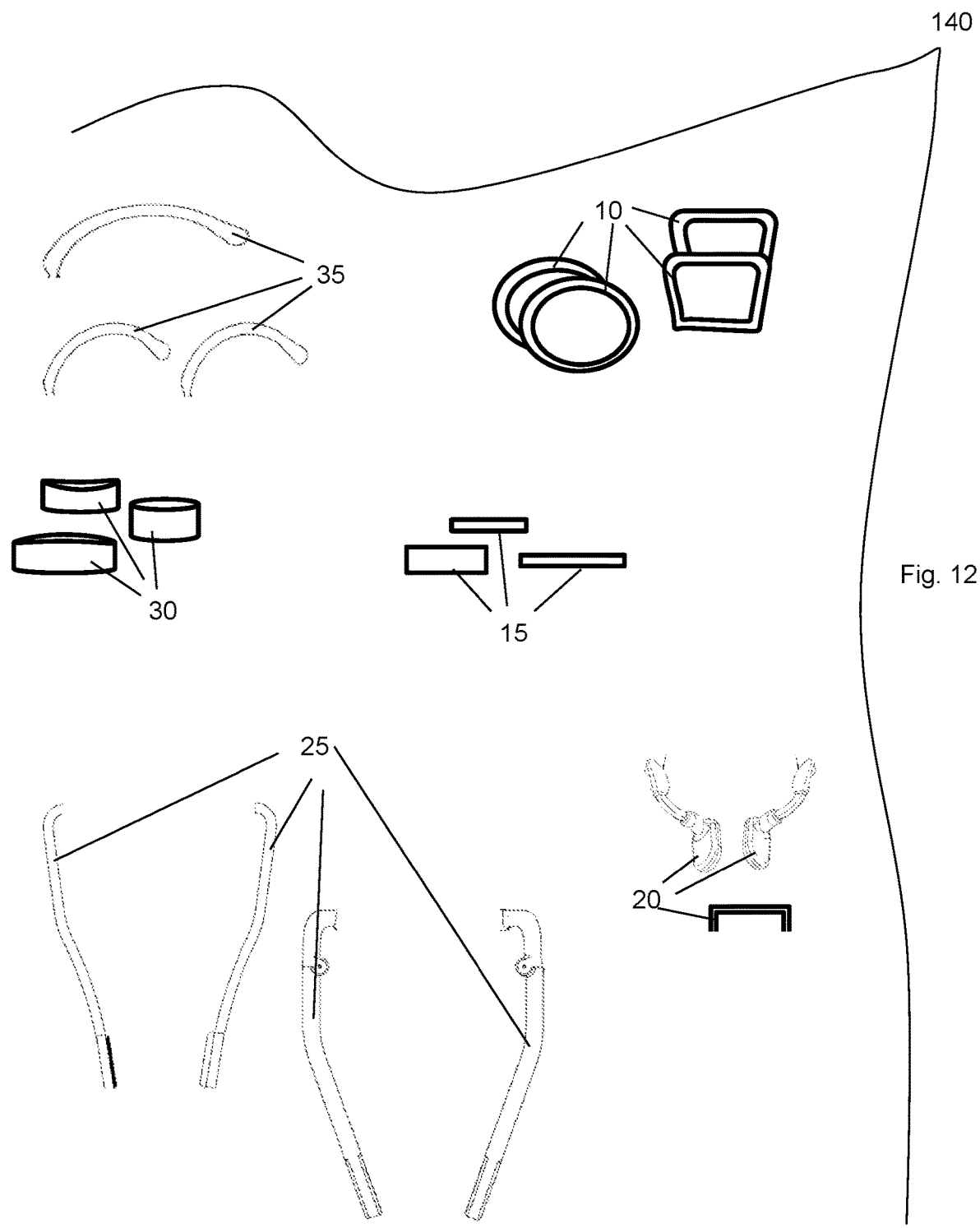
FIG. 12 illustrates a kit comprising various components of eyeglass frames in accordance with some embodiments of the presently disclosed subject matter.

In some embodiments, frames 5 can be configured as kit 140, as shown in FIG. 12. For example, each kit can include a pair of rims of several different shapes, bridges 15 of varying lengths to accommodate wearers with different sized faces (e.g., children versus adults), and/or nosepieces of different designs. The kit can further include arms 25 in a range of different lengths and thicknesses to accommodate different wearer preferences. Earpieces can also be included, as well as temple pads of various shapes and sizes. Thus, a user can mix and match the different components of frames 5 to suit their individual preferences and needs.

Figure 13:
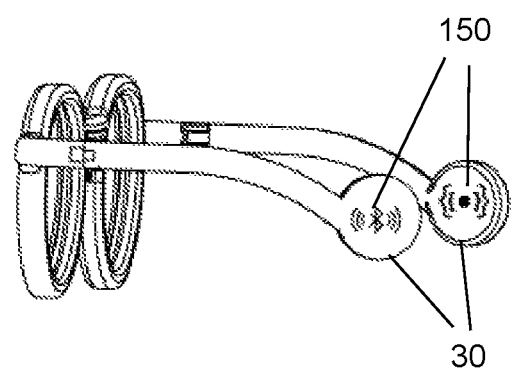
FIG. 13 is a side perspective view of a pair of frames comprising one or more vibratory elements positioned with the temple pads in accordance with some embodiments of the presently disclosed subject matter.

FIG. 13 illustrates one embodiment of frames 5 comprising one or more vibratory elements 150 positioned on, adjacent to, or within temple pads 30. Thus, the frames can produce a vibratory motion (e.g., massage therapy) at the bony temple area of the wearer. This can prove helpful in treatment of headache, migraines, anxiety, and the like.

Figure 14A:
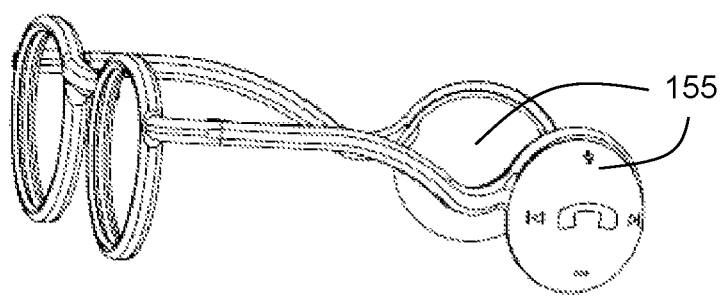
FIGS. 14a and 14b are side perspective views of frames comprising an audio over the ear component that allows for connection to external devices.
Figure 14B:
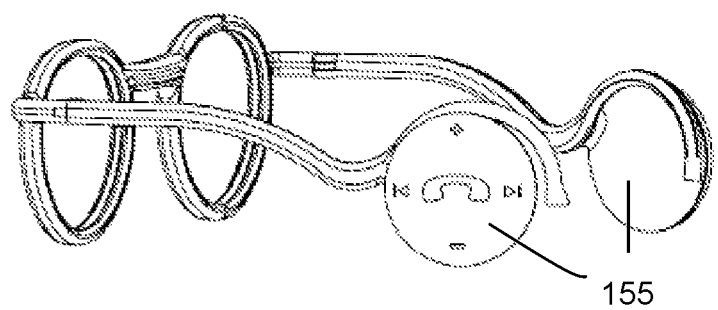

FIGS. 14a and 14b illustrate one embodiment of frames comprising audio component 155 that can be configured as over-the-ear headphones that can connect to external devices through Bluetooth® or other similar technology. The frames can therefore allow a wearer to accept phone calls while the frames are being worn. The audio component can include speakers, receivers, and the like. The audio component can further be configured to fit fully over, partially over, or within a user's ear or ears.

An electronic version of the device that includes an audio component-Over the ear headphones that which could connect to external devices via Bluetooth.

Advantageously, the temple pads alone or in combination with earpieces 35 allows for enhanced structural fitting from the back of the frames without inducing any pressure onto the sides of the wearer's head. The frames further do not occlude any vascular structures on the wearer's face. The earpieces align with the exact curve of the ear, providing stability and for comfort of the user. In addition, the nosepiece is structured to allow for a springy bounce without applying pressure to the nose. Accordingly, the nosepieces offer structural support for frames 5 and ensure that the frames do not move (e.g., slip down the nose). The nosepiece also offers improved comfort to the wearer's nose.

Any of the components of frames 5 can be constructed from any suitable material. For example, the frames can include metals (e.g., titanium, stainless steel, beryllium, nitinol, aluminum, silver, gold), plastic, elastomer, rubber, wood, leather, composite material, stones, or combinations thereof.

The disclosed frames therefore offer many advantages over prior art frames. For example, frames 5 provide increased comfort to the user on the nose, around the ears, and/or on the temple area.

The frames further are maintained on the face due to the earpieces, nosepieces, and/or temple pads, even when the wearer is in motion (e.g., walking, running, dancing, and the like). The frames can even maintain position on the wear's face in the presence of moisture, such as sweat, rain, and the like.

In addition, the disclosed frames are unique in shape, and can be used as a fashion staple for many years to come.

The disclosed frames are also durable and can be worn and enjoyed by wearers for an extended period of time.

Advantageously, the disclosed frames meet all rules and regulations set forth by the U.S. Food and Drug Administration.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A pair of eyeglass frames, the frames comprising:
   first and second rims configured to retain a lens, wherein each rim comprises an inner cavity, an outer edge and an opposed inner edge, and a front surface and an opposed rear surface;
   a bridge connecting the inner edges of the first and second rims;
   a nosepiece;
   a first arm comprising a first end attached to the outer edge of the first rim and a second end comprising a temple pad;
   a second arm comprising a first end attached to the outer edge of the second rim and a second end comprising a temple pad;
   a first earpiece attached to the second end of the first arm, and a second earpiece attached to the second end of the second arm;
   wherein the temple pads are each defined by a first surface and an opposed second surface.

2. The frames of claim 1, further comprising a pair of lenses, one positioned in each rim inner cavity.

3. The frames of claim 1, wherein the nosepiece comprises an inverted U-shaped member positioned on a lower edge of the bridge.

4. The frames of claim 1, wherein the nosepiece comprises a pair of attachments, each attachment comprising a first end connected to a rear surface of the bridge, and a second end comprising padding.

5. The frames of claim 1, further comprising a first extension positioned between the first end of the first arm and the outer edge of the first rim, and a second extension positioned between the first end of the second arm and the outer edge of the second rim.

6. The frames of claim 5, wherein each extension comprises a hinge.

7. The frames of claim 1, wherein each arm comprises a first segment positioned adjacent to the first or second rim, the first segment configured in a first shape and a second segment positioned adjacent to the first segment, wherein the second segment has a shape that differs from the shape of the first segment.

8. The frames of claim 7, wherein the second segment has a tapered shape.

9. The frame of claim 1, wherein the temple pads have a circular cross-sectional shape.

10. The frame of claim 1, wherein each temple pad first surface, second surface, or both are convex.

11. The frame of claim 1, wherein each temple pad first surface, second surface, or both are concave.

12. The frame of claim 1, wherein the first and second earpieces comprise a circular or oval shape.

13. An eyeglass frame kit comprising:
    one or pairs of rims, each pair of rims defined by first and second rims configured to retain a lens, wherein each rim comprises an inner cavity, an outer edge and an opposed inner edge, and a front surface and an opposed rear surface;
    one or more bridges connecting the inner edges of a pair of first and second rims;
    one or more nosepieces;
    one or more pairs of arms, each pair of arms defined by a first arm comprising a first end attached to the outer edge of a first rim and a second end comprising a temple pad, and a second arm comprising a first end attached to the outer edge of a second rim and a second end comprising a temple pad;
    wherein the temple pads are each defined by a first surface and an opposed second surface; and
    wherein the kit further comprises one or more pairs of earpieces, each pair of earpieces defined by a first earpiece attached to the second end of a first arm, and a second earpiece attached to the second end of a second arm.

14. A method of retaining a pair of eyeglass frames on a wearer, the method comprising:
    positioning a pair of eyeglass frames on the wearer, the eyeglass frames defined by:
        first and second rims configured to retain a lens, wherein each rim comprises an inner cavity, an outer edge and an opposed inner edge, and a front surface and an opposed rear surface;
        a bridge connecting the inner edges of the first and second rims;
        a nosepiece;
        a first arm comprising a first end attached to the outer edge of the first rim and a second end comprising a temple pad;
        a second arm comprising a first end attached to the outer edge of the second rim and a second end comprising a temple pad;
        earpieces defined by a first earpiece attached to the second end of the first arm, and a second earpiece attached to the second end of the second arm;
        wherein each temple pad is defined by a first surface and an opposed second surface;

positioning the bridge on a top surface of the wearer's nose;

positioning the first surface of each temple pad adjacent to a temple region of the wearer;

wherein the eyeglass frames are retained on the wearer.

15. The method of claim 14, further comprising positioning the first earpiece around a first ear of the wearer and positioning the second earpiece around a second ear of the wearer.

16. The method of claim 14, wherein the first and second arms taper from the first end to the second end.

17. The method of claim 14, wherein each temple pad first surface, second surface, or both surfaces are convex or concave.

18. The method of claim 14, wherein the temple pads have a circular cross-sectional shape.

* * * * *